United States Patent
Kojima et al.

(10) Patent No.: US 8,612,104 B2
(45) Date of Patent: Dec. 17, 2013

(54) CLUTCH CONTROL DEVICE AND μ CORRECTION COEFFICIENT CALCULATING METHOD

(75) Inventors: Hiroyuki Kojima, Saitama (JP); Yoshiaki Tsukada, Saitama (JP); Takashi Ozeki, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 12/920,124

(22) PCT Filed: Mar. 3, 2009

(86) PCT No.: PCT/JP2009/053925
§ 371 (c)(1),
(2), (4) Date: Aug. 30, 2010

(87) PCT Pub. No.: WO2009/122841
PCT Pub. Date: Oct. 8, 2009

(65) Prior Publication Data
US 2011/0004380 A1    Jan. 6, 2011

(30) Foreign Application Priority Data

Mar. 31, 2008  (JP) ................ 2008-093034

(51) Int. Cl.
*F16D 48/02*  (2006.01)
*F16D 25/10*  (2006.01)
*F16D 25/12*  (2006.01)

(52) U.S. Cl.
USPC ............... 701/53; 192/3.51; 477/175

(58) Field of Classification Search
USPC ............... 477/175; 701/53; 192/3.51
See application file for complete search history.

(56) References Cited

U.S. PATENT DOCUMENTS 4,582,185 A * 4/1986 Grimes et al. ............. 477/169
5,393,274 A * 2/1995 Smedley .................... 477/74
(Continued)

FOREIGN PATENT DOCUMENTS

DE  19824480 A1  12/1998
EP  1630442  *  3/2006
(Continued)

OTHER PUBLICATIONS

Derwent No. 2006-186574 to Tamaru citing EP 1630442 as a family member for "Clutch Control Device . . . " Mar. 1, 2006.*

(Continued)

*Primary Examiner* — James Trammell
*Assistant Examiner* — Jean-Paul Cass
(74) *Attorney, Agent, or Firm* — Squire Sanders (US) LLP

(57) ABSTRACT

Actual-rotational-difference absorption-torque calculation means 150 inputs a rate-of-change $\Delta Ne$ of an engine speed during shifting to an actual rotational difference absorption torque-$\Delta Ne$ table 160 so that an actual-rotational-difference absorption-torque average value during shifting is calculated. Engine-torque calculation means 180 inputs a throttle opening and an engine speed to engine-torque estimation-value map 190, and derives an engine torque during shifting. An actual clutch capacity is calculated from the sum of the actual-rotational-difference absorption-torque average value and the engine torque average value during shifting. From the ratio of the actual clutch capacity and a demanded clutch capacity, μ-correction-coefficient calculation means 130 calculates a μ correction coefficient. By using a control correction amount calculated on the basis of the μ correction coefficient, a transmission control unit 100 drive-controls a first clutch CL1 and a second clutch CL2. Thus, correction on the clutch capacity is performed during running.

15 Claims, 8 Drawing Sheets

(56) References Cited

U.S. PATENT DOCUMENTS

| | | | |
|---|---|---|---|
| 5,679,091 A | 10/1997 | Salecker et al. | |
| 5,960,669 A * | 10/1999 | Ohashi et al. | 74/335 |
| 6,022,295 A * | 2/2000 | Liu | 477/180 |
| 6,334,082 B1 * | 12/2001 | Jeon | 701/55 |
| 6,334,084 B1 * | 12/2001 | Moteki et al. | 701/114 |
| 6,334,833 B1 * | 1/2002 | Ochi et al. | 477/143 |
| 6,603,214 B1 * | 8/2003 | Kayano et al. | 290/40 C |
| 6,961,647 B2 * | 11/2005 | Matsumura et al. | 701/55 |
| 7,158,873 B2 * | 1/2007 | Eich et al. | 701/68 |
| 7,628,260 B2 * | 12/2009 | Dickinson | 192/3.29 |
| 8,066,619 B2 * | 11/2011 | Herchick et al. | 477/175 |
| 8,235,868 B2 * | 8/2012 | Fukaya et al. | 477/127 |
| 2004/0064232 A1 | 4/2004 | Eich et al. | |
| 2004/0172184 A1 * | 9/2004 | Vukovich et al. | 701/51 |
| 2006/0185459 A1 | 8/2006 | Matsumura et al. | |
| 2009/0112417 A1 * | 4/2009 | Kaminsky et al. | 701/54 |
| 2009/0247362 A1 * | 10/2009 | Nedachi et al. | 477/172 |
| 2009/0299590 A1 * | 12/2009 | Nedachi et al. | 701/68 |

FOREIGN PATENT DOCUMENTS

| | | | | |
|---|---|---|---|---|
| JP | 7301326 | | 11/1995 | |
| JP | 9-170630 A | | 6/1997 | |
| JP | 09170630 A | * | 6/1997 | F16D 25/14 |
| JP | 11344106 | | 12/1999 | |
| JP | 2004197842 | | 7/2004 | |
| JP | 2006226433 | | 8/2006 | |
| JP | 2006-336854 A | | 12/2006 | |
| JP | 2008 105439 | * | 5/2008 | |
| WO | 03087615 A1 | | 10/2003 | |
| WO | 2005/047723 | | 5/2005 | |

OTHER PUBLICATIONS

Japanese Rejection Notice application No. 2008-093034 dated Dec. 12, 2012.

Supplementary European Search Report dated Oct. 18, 2012 issued in corresponding EP09727874.

* cited by examiner

CLUTCH CONTROL DEVICE AND μ CORRECTION COEFFICIENT CALCULATING METHOD

TECHNICAL FIELD

The present invention relates to a clutch control device and a μ correction coefficient calculating method. Particularly, the present invention relates to a clutch control device and a μ correction coefficient calculating method both of which can detect a change of a clutch capacity during running, obtain a μ correction coefficient based on this change, and perform appropriate correction on the clutch capacity on the basis of this μ correction coefficient.

BACKGROUND ART

A clutch device has been known conventionally in which a clutch for transmitting a rotational driving force of a power source to a drive wheel by a frictional force of a friction plate (clutch plate) is drive-controlled by an actuator. In such a clutch device, for example, when the clutch plate is worn out and becomes thin, the same frictional force may not be acquired even if a drive amount of the actuator is the same as before. Such a problem can be solved by for example, detecting a movement amount required for clutch plates, which are apart from each other, to come into contact with each other, and by increasing the drive amount of the actuator in accordance with an increase of this movement amount.

Patent Document 1 discloses a structure in which a movement amount required for clutch plates to come into contact with each other is detected on the basis of a position of a member displaced by an actuator.

[Patent Document 1] Japanese Patent Application Publication No. 2004-197842

SUMMARY OF INVENTION

Technical Problem

Meanwhile, in a clutch in which a pressing force for connecting the clutch is obtained not by an elastic member, such as a clutch spring, but a driving force of an actuator or an oil pressure controlled by the actuator, when a frictional force generated in a clutch plate is changed with the driving force or the oil pressure supplied after the contact of the clutch plates, a maximum torque value which can be transmitted by the clutch, i.e., a clutch capacity, will change.

The technique described in Patent Document 1 is to estimate a wearing degree of the clutch plate on the basis of a drive amount of the actuator. The technique is not capable of detecting a change of a clutch capacity due to deterioration of the clutch plate or a change of the characteristics of an oil for operating the clutch. In other words, in Patent Document 1, detecting a variation of the clutch capacity and controlling of the clutch on the basis of this variation are not taken into consideration.

An object of the present invention is to solve the above-described problem of the conventional technology and to provide a clutch control device and a μ correction coefficient calculating method both of which can detect a change of a clutch capacity during running, obtain a μ correction coefficient based on this change and perform appropriate correction on the clutch capacity on the basis of this μ correction coefficient.

Solution to Problem

To attain the above object, a first aspect of the present invention is a clutch control device characterized as follows. The clutch control device is for a clutch which connects and disconnects a rotational driving force transmitted to a staged transmission from an engine of a vehicle. The clutch control device includes: clutch control means for controlling an control amount of the clutch; engine-speed detection means for detecting a speed of the engine; shifting-condition detection means for detecting a shifting condition of the transmission; ΔNe-during-shifting calculation means for detecting a rate-of-change of the engine speed during, shifting of the transmission; actual-rotational-difference absorption-torque calculation means for calculating an actual-rotational-difference absorption torque used for a rotational change during the shifting by applying the rate-of-change of the engine speed into the calculation; engine-torque calculation means for calculating an engine torque which the engine generates, by applying at least a throttle opening and the engine speed into the calculation; and μ-correction-coefficient calculation means for calculating a correction coefficient of a friction coefficient of the clutch. The μ-correction-coefficient calculation means calculates an actual clutch capacity from a sum of an average value of actual-rotational-difference absorption-torques during shifting and an average value of engine torques calculated during the shifting, and further calculates a μ correction coefficient on the basis of a ratio of the actual clutch capacity and a demanded clutch capacity calculated from a condition of the vehicle. The clutch control means controls the clutch on the basis of the μ correction coefficient.

Furthermore, a second aspect is that the demanded clutch capacity is a sum of an average value of demanded-rotational-difference absorption torques during shifting calculated from a predetermined value and the average value of the engine torques during the shifting.

Furthermore, a third aspect is that at least one of the calculation of the rate-of-change of the engine speed and the calculation of the average value of the engine torques is performed in a sampling period when it is determined by the shifting-condition detection means that a gear ratio of the transmission is changing in response to a shifting signal sent to the transmission.

Furthermore, a fourth aspect is that the calculation of the μ correction coefficient is not performed when the sampling period is shorter than a predetermined period.

Furthermore, a fifth aspect is that the calculation of the μ correction coefficient is not performed when a rate-of-change of the gear ratio measured during the shifting is smaller than a predetermined value.

Furthermore, a sixth aspect is that the calculation of the μ correction coefficient is not performed when the throttle opening measured during the shifting is smaller than a predetermined value.

Furthermore, a seventh aspect is that the calculation of the μ correction coefficient is not performed when a rate-of-change of the throttle opening measured during the shifting is larger than a predetermined value.

Furthermore, an eighth aspect is that: the clutch is of a twin clutch type including a first clutch and a second clutch, and is structured so that connecting states of the first clutch and the second clutch may be switched alternatively for every shifting operation, thereby transmitting the rotational driving force of a power source to a drive wheel; and that the calculation of the μ correction coefficient is performed at the time of the shifting operation.

Furthermore, a ninth aspect is a μ correction coefficient calculating method characterized as follows. The method is for calculating a μ correction coefficient to control a clutch which connects and disconnects a rotational driving force transmitted to a staged transmission from an engine of a vehicle. The method includes the procedures of detecting a rate-of-change of an engine speed during shifting of the transmission; calculating an actual-rotational-difference absorption torque used for a rotational change during the shifting by inputting the rate-of-change of the engine speed to a predetermined data table; calculating an engine torque which the engine generates by inputting at least a throttle opening and the engine speed to a predetermined data map; and calculating an actual clutch capacity from a sum of average values of the actual-rational-difference absorption torque and the engine torque during the shifting calculated during the shifting, respectively, and further calculating the μ correction coefficient on the basis of a ratio of the actual clutch capacity and a demanded clutch capacity calculated from a condition of the vehicle.

Advantageous Effects of Invention

According to the first aspect, a rate-of-change ΔNe of an engine speed during shifting is inputted to the actual-rotational-difference absorption-torque calculation means so that an actual-rotational-difference absorption torque during shifting is calculated. A throttle opening and an engine speed are inputted to the engine-torque calculation means so that an engine torque during shifting is calculated. Furthermore, an actual clutch capacity is obtained from the actual-rotational-difference absorption torque and the engine torque, and a μ correction coefficient is calculated on the basis of a ratio of the actual clutch capacity and a demanded clutch capacity; thereby, on the basis of the rate-of-change of the engine speed during shifting and the engine torque, the actual clutch capacity and the μ correction coefficient can he calculated. Accordingly, even when a clutch capacity, i.e., a maximum value of an engine torque which can be transmitted by e clutch changes due to, for example deterioration of a clutch plate over time or a change of the characteristics of an oil for operating the clutch, it becomes possible to continue suitable clutch control using the friction coefficient to which the μ correction coefficient is applied. Furthermore, the more stable running feeling is obtained without being affected by influences, such as the difference in engine output characteristics, the product variation of a clutch, or the product variation of an actuator which drives the clutch.

According to the second aspect, the demanded clutch capacity is the sum of an average value of demanded-rotational-difference absorption torques during shifting calculated from a predetermined value and an average value of the engine torques during the shifting. Accordingly, by setting a table, in advance, for calculating the demanded-rotational-difference absorption torque, it becomes possible to easily calculate the demanded clutch capacity.

According to the third aspect, at least one of the calculation of the rate-of-change of the engine speed and the calculation of the average value of the engine torques is performed in a sampling period when it is determined by the shifting-condition detection means that a gear ratio of the transmission is changing in response to a shifting signal sent to the transmission. Accordingly, it is effective to a delayed operation after the shifting signal is sent until the shifting is actually started. Furthermore, it becomes possible to calculate ΔNe or an average value of the engine torques in the period when fluctuation of the engine speed is stabilized.

According to the fourth aspect, the calculation of the μ correction coefficient not performed when the sampling period is shorter than a predetermined period. Accordingly, when a μ correction coefficient effective in control of the clutch control amount cannot be calculated, for example, when a throttle is returned during shifting and the shifting operation is completed in a shorter time than usual, the load of arithmetic processing can be reduced by not performing unnecessary arithmetic processing.

According to the fifth aspect, the calculation of the μ correction coefficient is not performed when a rate-of-change of the gear ratio measured during the shifting is smaller than a predetermined value. Accordingly, when the clutch control amount does not much need to be controlled, for example, at the time of shifting between higher-speed gear steps with a small rate-of-change of the gear ratio ((or example, at the time of the shift up from a fifth speed to a sixth speed), the load of arithmetic processing can be reduced by not performing unnecessary arithmetic processing.

According to the sixth aspect, the calculation of the μ correction coefficient is not performed when the throttle opening measured during the shifting is smaller than a predetermined value. Accordingly, for example, when an engine output is smaller than a predetermined value so that μ correction coefficient effective in control of the clutch control amount cannot be calculated, the load of arithmetic processing can be reduced by not performing unnecessary arithmetic processing.

According to the seventh aspect, the calculation of the μ correction coefficient is not performed when a rate-of-change of the throttle opening measured during the shifting is larger than a predetermined value. Accordingly, for example, when the fluctuation of the engine output during shifting is large so that μ correction coefficient effective in control of the clutch control amount cannot be calculated, the load of arithmetic processing can he reduced by not performing unnecessary arithmetic processing.

According to the eighth aspect, the clutch is of the twin clutch including the first clutch and the second clutch, and is structured so that connecting states of the first clutch and the second clutch may be switched alternatively for every shifting operation, thereby transmitting the rotational driving force of the power source to the drive wheel; and the calculation of the μ correction coefficient is performed at the time of the shifting operation. Accordingly, the clutch control to which the μ correction coefficient is applied becomes possible in the clutch control device of the twin clutch type.

According to the ninth aspect, the μ correction coefficient calculating method includes the procedures of: detecting a rate-of-change of an engine speed during shifting of the transmission; calculating an actual-rotational-difference absorption torque used for a rotational change during the shifting by inputting the rate-of-change of the engine speed to a predetermined data table; calculating an engine torque which the engine generates by inputting at least a throttle opening and the engine speed to a predetermined data map; and calculating an actual clutch capacity from a sum of average values of the actual-rotational-difference absorption torque and the engine torque during the shifting calculated during the shifting, respectively, and further calculating the μ correction coefficient on the basis of a ratio of the actual clutch capacity and a demanded clutch capacity calculated from a condition of the vehicle. Accordingly, the basis of the rate-of-change of engine speed and the engine torque during shifting, it becomes possible to calculate the actual clutch capacity and the μ correction coefficient.

DESCRIPTION OF EMBODIMENTS

Hereafter, with reference to drawings, a preferable embodiment of the present invention will be described in detail. FIG. 1 is a system block diagram of an automatic manual transmission (hereinafter, AMT) 16 and its peripheral devices the AMT adopted as an automatic transmission in a motorcycle. FIG. 2 is an arrangement relationship diagram showing an engagement relation of each shaft and speed gear in the AMT 16. The AMT 16 is a twin clutch type transmission device which connects and disconnects a rotational driving force of an engine with two clutches disposed on a main shaft. The AMT 16 connected to an engine 11 is drive-controlled by a clutch hydraulic device 17 and an AMT control unit 18 as a transmission control device. The engine 11 has a throttle body 19 of a throttle-by-wire type, and the throttle body 19 is provided with a motor 20 for opening and closing the throttle.

The AMT 16 includes a transmission 21 of six forward speeds, a first clutch CL1, a second clutch CL2, a shift drum 24, and a shift control motor 25 which rotates the shift drum 24. A large number of gears which constitute the transmission 21 are bonded to or loosely fitted with a main shaft 26 and a counter shaft 27. The main shaft 26 includes an inner main shaft 26a and an outer main shaft 26b. The inner main shaft 26a is bonded to the first clutch CL1, and the outer main shaft 26b is bonded to the second clutch CL2. The main shaft 26 and the counter shaft 27 are provided with the speed gears which can be freely displaced in an axial direction of the main shaft 26 and in an axial direction of the counter shaft 27. End portions of shift forks 23 are engaged with guide grooves (not shown) formed in the shift drum 24 and the speed gears.

A primary driving gear 31 is bonded to an output shaft of the engine 11, i.e. a crankshaft 30, and this primary driving gear 31 is engaged with a primary driven gear 32. The primary driven gear 32 is connected to the inner main shaft 26a via the first clutch CL1, and is connected to the outer main shaft 26b via the second clutch CL2. The AMT 16 includes an inner-main-shaft rotational speed sensor 73 and an outer-main-shaft rotational speed sensor 74 which detect rotational speeds of the inner main shaft 26a and the outer main shaft 26b, respectively, by measuring the rotational speed of a predetermined speed gear on the counter shaft 27.

A driving sprocket 35 is bonded to the counter shaft 27, and a driving force is transmitted to a rear wheel as a drive wheel via a drive chain (now shown) which is wound and hung around this driving sprocket 35. In the AMT 16, provided are: an engine speed sensor 36 which is disposed so as to face an outer circumference of the primary driven gear 32; a gear position sensor 38 which detects a present gear step on the basis of the rotation position of the shift drum 24; a shifter sensor 64 which detects a rotation position of a shifter that is driven by the shift control motor 25; and a neutral switch 63 which detects that the shift drum 24 is at a neutral position. Furthermore, a throttle opening sensor 47 which detects a throttle opening is provided in the throttle body 19.

The clutch hydraulic device 17 has a structure in which a lubricant of the engine 11 is also used as a hydraulic fluid for driving the clutch CL. The clutch hydraulic device 17 includes an oil tank 39 and a pipe line 40 for supplying and feeding the oil (hydraulic fluid) in this oil tank 39 to the first clutch CL1 and the second clutch CL2. On the pipe line 40, provided are: a hydraulic pump 41 as an oil pressure supply source; and a valve (electronic control valve) 42 as an actuator. On a return pipe line 43 which is connected to the pipe line 40, disposed is a regulator 44 for maintaining the pressure of an oil supplied to the valve 42 at a constant value. The valve 42 has a structure so that the valve 42 can apply the oil pressure to the first clutch CL1 and the second clutch CL2 individually. The valve 42 is also provided with a return pipe line 45 of oil.

A pipe line which connects a first valve 42a to the first clutch CL1 is provided with a first-clutch-oil-pressure sensor 75 which measures an oil pressure generated in the first clutch CL1. Similarly, a pipe line which connects a second valve 42b to the second clutch CL2 is provided with a second-clutch-oil-pressure sensor 76 which measures an oil pressure generated in the second clutch CL2.

The AMT control unit 18 is connected to a mode switch 49 which switches between an automatic transmission (AT) mode and a manual transmission (MT) mode, and a shift select switch 50 which indicates shift up (UP) or shift down (DN). The AMT control unit 18 includes a central processing unit (CPU), controls the valve 42 and the shift control motor 25 in response to the output signals from the above-described respective sensors and switches, and can switch the gear stage of the AMT 16 automatically or semi-automatically.

The AMT control unit 18 switches the speed stage automatically according to information, such as the vehicle speed, the engine speed, and the throttle opening, when the AT mode is selected. On the other hand, the AMT control unit 18 shifts up or shifts down the transmission 21 with operation of the shift select switch 50, when the MT mode is selected. Furthermore, even when the MT mode is selected, an auxiliary automatic transmission control can be performed for preventing an overspeed and a stall of the engine.

In the clutch hydraulic device 17, an oil pressure is applied to the valve 42 by the hydraulic pump 41, and this oil pressure is controlled by the regulator 44 so that the oil pressure may not exceed an upper limit value. When the valve 42a or the valve 42b is opened by the command from the AMT control unit 18, the oil pressure is applied to the first clutch CL1 or the second clutch CL2, and the primary driven gear 32 is connected to the inner main shaft 26a or the outer main shaft 26b via the first clutch CL1 or the second clutch CL2. On the other hand, when the valve is closed and the application of the oil pressure is stopped, the first clutch CL1 and the second clutch CL2 are energized, by return springs (now shown) incorporated therein, in the direction so that the connections to the inner main shaft 26a and the outer main shaft 26b can be cut off.

The valve 42 which drives the clutch by opening and closing the pipe line connecting the pipe line 40 to both of the first clutches CL1 and CL2 is structured so that the AMT control unit 18 can change arbitrarily the time or the like from a full close state to a full open state of the pipe line, on the basis of a drive signal.

The shift control motor 25 rotates the shift drum 24 according to the command from the AMT control unit 18. When the shift drum 24 rotates, the shift fork 23 is displaced in an axial direction of the shift drum 24 according to the shape of the id grooves formed in the outer circumference of the shift drum 24. With this, the gear engagement on the counter shaft 27 and the main shaft 26 changes, and the shift up or the shift down of the transmission 21 is performed.

The AMT 16 according to the present embodiment is structured so that the inner main shaft 26a bonded to the first clutch CL1 may support odd-numbered speed gears (first, third, and fifth speed) and the outer main shaft 26b bonded to the second clutch CL2 may support even-numbered speed gears (second, fourth, and sixth speed). Therefore, for example, during running in the odd-numbered speed gear, an oil pressure supply to the first clutch CL1 is continued, and a connected state is maintained. Furthermore, while a shift change is performed, it becomes possible, by changing the gear engagement in advance by the rotation of the shift drum 24, to complete the shifting operation only by switching the connected states of the two clutches, Referring to FIG. 2 additionally, the inner main shaft 26a which is connected to the first clutch CL1 supports driving gears M1, M3, and M5 of the odd-numbered speed stage. The first speed driving gear M1 is formed to the inner main shaft 26a integrally. Furthermore, the third speed driving gear M3 is attached slidably in the axial direction and non-rotatably in the circumferential direction. The fifth speed driving gear M5 is attached non-slidably in the axial direction and rotatably in the circumferential direction. On the other hand, the outer main shaft 26b which is connected to the second clutch CL2 supports driving gears M2, M4, and M6 of the even-numbered speed stage. The second speed driving gear M2 is formed to the outermain shaft 26b integrally. Furthermore, the fourth speed driving gear M4 is attached slidably in the axial direction and non-rotatably in the circumferential direction. The sixth speed driving gear M6 is attached non-slidably in the axial direction and rotatably in the circumferential direction.

Meanwhile, the counter shaft 27 supports driven gears C1-C6 which engage with the driving gears M1-M6. The first to the fourth speed driven gears C1-C4 are attached non-slidably in the axial direction and rotatably in the circumferential direction. The fifth and sixth speed driven gears C5 and C6 are attached slidably in the axial direction and non-rotatably in the circumferential direction. In the AMT 16, the driving gears M3 and M4 and the driven ears C5 and C6, i.e., gears which are slidable in the axial direction, among the above-described gear train, are slid by the shift forks 23. Accordingly, the shifting operation is performed by connecting and disconnecting a dog clutch.

In the AMT 16, for example, when the first speed gear is selected, the rotational driving force of the engine, which is transmitted to the primary driven gear 32 from the crankshaft 30, is transmitted to the inner main shaft 26a by connecting the first clutch CL1 thereto. The rotational driving force is transmitted to the counter shaft 27 via the first speed driven gear C1 from the first speed driving gear M1. At this time, a dogs clutch for the first speed is in a state of being engaged between the first speed driven gear C1 and the fifth speed driven gear C5.

Furthermore, when the rotational driving force is transmitted by the first speed gear the AMT 16 can execute "preliminary shifting" which prepares a speed change for the second speed by engaging a dog clutch for the second speed, i.e., the dog clutch between the sixth speed driven gear C6 and the second speed driven gear C2. At this time, since the second clutch CL2 is disconnected, even if the dog clutch for the second speed is engaged during running in the first speed gear, the rotational driving force of the engine only makes the outer main shaft 26b run idle with the second speed driving gear M2. Furthermore, after this preliminary shifting, if the connected state of the clutch is switched from the first clutch CL1 to the second clutch CL2, the rotational driving force can be outputted instantly without interruption from the counter shaft via the second speed gear.

The shift drum 24 of the AMT 16 is set to have a position of "waiting for neutral" between each of the predetermined rotating positions for selecting each speed stage. At the position of "waiting, for neutral", a group of gears not transmitting the rotational driving force, among groups of the even-numbered speed gears and the odd-numbered speed gears, is made to be in a neutral state. For this reason, it is possible to make the odd-numbered speed gear into the neutral state during running, in the even-numbered speed gear, as well as to make the even-numbered speed gear into the neutral state during running in the odd-numbered speed gear.

FIG. 3 is a block diagram showing a structure of the AMT control unit 18 according to the embodiment of the present invention and its peripheral devices. The same numerals as the above show the same or equivalent components. The AMT o control unit 18 includes a transmission control unit 100 in which a shift map 101 and a timer 102 are stored. The transmission control unit 100 including clutch control means drives the shift control motor 25 and the valve 42 and performs the shifting operation, during normal running of a vehicle, on the basis of the ear position sensor 38, the engine speed sensor 36, the throttle opening sensor 47, and vehicle speed information, and according to the shift map 101 which is a three-dimensional map or the like. Furthermore, the transmission control unit 100, at the time of automatic shifting according to the shift map 101 and at the time of semiautomatic shifting by operation of the shift select switch 50, also functions as shifting-condition detection means to detect a shifting condition, by a given shifting signal, for example, that the shifting is being performed. Note that, whether the AMT 16 is in shifting may be detected on the basis of output signals from the gear position sensor 38, the engine speed sensor 36, and the like.

On the basis of a rate-of-change $\Delta Ne$ in an engine speed during shifting, the AMT control unit 18 is structured to detect a maximum torque value which both the clutches CL1 and CL2 can transmit, i.e., a clutch capacity. Furthermore, the AMT control unit 18 is capable of calculating a control correction amount of a clutch on the basis of this clutch capacity to feedback control the clutch. According to this feedback control, even when the clutch capacity is decreased by deterioration of a clutch plate or a change of the characteristics of the oil for operating the clutch, the changing of feeling at the time of starting the vehicle and shifting can be prevented, by increasing, a pressing force of the clutch in response to this decreased clutch capacity Although details will be described later, the above-described detection of the clutch capacity becomes possible by installing means (actual-rotational-difference absorption-torque calculation means) which calculates a torque used for rotational change during shifting (actual-rotational-difference absorption torque), on the basis of the rate-of-change $\Delta Ne$ of the engine speed during shifting.

When an actual clutch capacity is calculated by clutch-capacity calculation means 140, a $\mu$ correction coefficient is calculated by $\mu$-correction-coefficient calculation means 130, on the basis of the ratio of the actual clutch capacity and a demanded clutch capacity. Here, the demanded clutch capacity is an initial set value when the lubricant of the clutch plate or the clutch is in a normal state set in advance. Furthermore, by correction-friction-coefficient calculation means 120, a correction friction coefficient used for calculation of a clutch control correction amount is calculated on the basis of the $\mu$ correction coefficient. Furthermore, clutch-control-correction-amount calculation means 110 inputs the correction friction coefficient to a predetermined arithmetic equation to calculate a control correction amount, and transmits it to the transmission control unit 100. The transmission control unit 100 feedback-controls both the clutches CL1 and CL2 on the basis of the control correction amount.

Actual-rotational-difference absorption-torque calculation means 150 described above inputs $\Delta Ne$ during, shifting calculated by $\Delta Ne$-during-shifting calculation means 170 into an actual rotational difference absorption torque-$\Delta Ne$ table 160 so that an actual-rotational-difference absorption torque during shifting can be calculated. Now, a calculation procedure of $\Delta Ne$ during shifting is explained with reference to FIG. 4.

FIG. 4 is a graph showing transition of an engine speed (Ne) at the time of a shifting operation. This graph corresponds to a state where the shift up was carried out to the second speed during acceleration in the first speed gear, for example. In the AMT 16, during the acceleration in the first speed gear, if the shifting operation is started at time t10, a so-called clutch switching operation is performed, in which a connected state of a twin clutch is switched from the first clutch CL1 to the second clutch CL2. At this time, although the first clutch CL1 is promptly disconnected, the second clutch CL2 is set to be connected with the oil pressure being raised in a step-by-step manner in order to reduce a shift shock.

In the example of FIG. 4, the Ne which has been gone up till then starts to descend at the time t10 in synchronism with the switching operation of the clutch. Furthermore, in a normal-state period A, the shifting operation is completed at time t20, and the Ne starts to go up again. In the normal state period A of the graph shows that the lubricant of the clutch plate or the clutch is in the normal state set initially. The rate-of-change of the engine speed during shifting, i.e., from the start to the end of the shifting operation is $\Delta$NeA.

In contrast, if a frictional force of the clutch plate decreases, i.e., the clutch capacity runs short, due to deterioration of the clutch plate or the change of the characteristics of the lubricant of the clutch, even when the valve 42 (see, FIG. 1) which controls the clutch is driven only by the same amount as the time of the normal state, a sliding amount of the clutch will increase. Furthermore, if the sliding amount of the clutch increases, a decreased degree of the engine speed will become small. As a result, the time until shifting completion will become long, in a clutch capacity shortage period B of the graph shows that: a sliding amount of the second clutch CL2 to be connected in synchronism with the shifting operation to the second speed increases, and becomes in a fully connecting state at time t30; and the shifting is completed. Accordingly, the rate-of-change of the engine speed during shifting in the clutch capacity shortage period B is $\Delta$NeB. The clutch control device according to the present embodiment aims at controlling both clutches so that the rate-of-change measured during shifting may meet the rate-of-change in the normal state period.

Furthermore, due to the shortage in the clutch capacity, if the time during which the clutch is slid at the time of shifting becomes long, the feeling at the e of shifting not only changes, but wearing of the clutch and deterioration of the engine oil are caused in an earlier period of time. In order to deal with this, an upper limit value is set in the period between the start and the end of shifting. If a measuring time from the s art of shifting reaches this upper limit value, the clutch may set to be connected in an early period of time. In the example shown in FIG. 5, while a shifting maximum period T1 is set, time elapsed from the time t10 is measured by the timer 102. In the clutch capacity shortage period B (shown as a dashed line), if the shifting maximum time T1 is reached at time t21 before the shifting is completed, it is set to increase the driving current of the valve 42. Accordingly, the shifting is caused to end at time t22 that is earlier than the time t30. In the present embodiment, is possible to perform the combination of: this correction after the shifting maximum time elapses; and the control by the control correction amount calculated on the basis of $\Delta$Ne during shifting.

Returning to FIG. 3, as described above, the actual-rotational-difference absorption-torque calculation means 150 inputs $\Delta$Ne calculated by the $\Delta$Ne-during-shifting calculation means 170 to the actual rotational difference absorption torque-$\Delta$Ne table 160 as predetermined data table shown in FIG. 6, so that an actual-rotational-difference absorption torque during shifting is derived. Furthermore, an actual-rotational-difference absorption-torque average value Tj is derived by dividing this actual-rotational-difference absorption torque by the period from the shifting start to the shifting completion. The actual rotational difference absorption torque-$\Delta$Ne table 160 is set in advance on the basis of an actual running test or the like.

Engine-torque calculation means 180 inputs information at least on the throttle opening and on the engine speed to an engine-torque estimation-value map 190 as a predetermined data map shown in F 7, and thereby derives an engine torque during shifting. The derivation of the engine torque is continuously performed during shifting. The engine-torque calculation means 180 temporarily stores an integrated value of these, divides it by the period from the shifting start to the shifting completion, and thereby calculates an engine torque average value Sh. Incidentally, the engine-torque estimation-value map 190 can be structured so that change of the engine torque due to an atmospheric pressure, an intake-air temperature, or the like, besides the throttle opening and the engine speed, may also be reflected.

Furthermore, in the clutch-capacity calculation means 140, an actual clutch capacity during shifting is calculated on the basis of the actual-rotational-difference absorption-torque average value Tj and the engine torque average value Sh. Now, FIG. 8 is referred to.

FIG. 8 is graph showing a relation between the actual clutch capacity and the demanded clutch capacity. The above-described actual clutch capacity is expressed as the sum of the actual-rotational-difference absorption-torque average value Tj and the engine torque average value Sh. Furthermore, the demanded clutch capacity in a normal state is expressed as the sum of a demanded-rotational-difference absorption-torque average value Ty and the engine torque average value Sh. The demanded-rotational-difference absorption torque of a predetermined value is a value in advance on the basis of the speed stage, the shift change direction, or the like, and can be derived from a predetermined data table (not shown). Furthermore, the demanded-rotational-difference absorption-torque average value Ty is obtained by dividing an integrated value of the demanded-rotational-difference absorption torques derived during shifting by the period from the shifting start to the shifting completion.

Returning to FIG. 3 again, the µ-correction-coefficient calculation means 130 calculates the µ correction coefficient on the basis of the ratio of the actual clutch capacity calculated in the clutch-capacity calculation means 140 and the demanded clutch capacity. The µ correction coefficient is expressed by the arithmetic equation of "$K=(Tj+Sh)/(Ty+Sh)$".

Furthermore, by the correction-friction-coefficient calculation means 120, a correction friction coefficient µh is calculated on the basis of the µ correction coefficient. Next, by the clutch-control-correction-amount calculation means 110, a control correction amount of the clutch is calculated using the correction friction coefficient µh. Now, FIG. 9 is referred to.

FIG. 9 is a block diagram showing a calculation procedure of the control correction amount by the clutch-control-correction-amount calculation means 110. First, at F1, a target clutch capacity C is calculated by "demanded clutch capacity×primary ratio". Here, the primary ratio is a gear ratio of the primary driving gear 31 and the primary driven gear 32, and is a value corresponding to the rotational speed ratio of the crankshaft 30 and the main shaft 26 (the inner main shaft 26a or the outer main shaft 26b).

Meanwhile, at F4, the correction friction coefficient μh is calculated by multiplying a value calculated by the arithmetic equation of "standard friction coefficient μ0×oil temperature correction value" at F2 by the μ correction coefficient at F3. Furthermore, at F5, a target clutch pressure P is calculated using the target clutch capacity C and the correction friction coefficient μh. The target clutch pressure P is obtained by the arithmetic equation of "((target clutch capacity C/(correction friction coefficient μh×clutch plate number×effective radius))+return spring load)/clutch piston pressure receiving area", as shown at F5. Furthermore, at F6, the target clutch pressure P is inputted to a target clutch pressure P-valve driving current 1 table, so that a valve driving current 1 is derived as the control correction value of the clutch at F7.

Returning to FIG. 3, the clutch-control-correction-amount calculation means 110 transmits the calculated control correction amount to the transmission control unit 100. Furthermore, the transmission control unit 100 drives the valves 42a and 42b according to this control correction amount, and feedback-controls the first clutch CL1 and the second clutch CL2. The clutch control device according to the present embodiment calculates ΔNe during shifting. Even when the sliding amount of the clutch during shifting becomes large due to the shortage of the clutch capacity, the clutch control device can correct this sliding amount appropriately by performing a series of the arithmetic equations as described above.

Note that, when the calculated control correction amount exceeds a predetermined value, by using warning means 200 composed of a warning light, a speaker, and the like, the clutch-control-correction-amount calculation means 110 is structured to inform a rider of this. Accordingly, it is possible to urge the rider to take an action, for example, exchanging the deteriorated clutch plate or the engine oil.

FIG. 10 is a flow chart (main flow) showing a flow of a clutch-control-correction-amount calculation processing according to the embodiment of the present invention. The flow of a series of processing corresponds to the arithmetic processing explained using FIGS. 4 to 8. At Step S1, it is determined whether or not a μ-correction-coefficient calculation condition is satisfied. This μ-correction-coefficient calculation condition can be set so as to determine the engine is in an operational status suitable for the calculation processing of the control correction amount of the clutch, such as a case where the temperature of the engine oil reaches a predetermined value, the engine speed is within a predetermined range, or the throttle opening's below a predetermined value or in a predetermined range. The calculation processing of the control correction amount may be set so as to perform only between gear steps with lower speeds which are large in a gear ratio at the time of shifting, or to perform by both or one case of the shift up and the shift down.

If an affirmative determination is made at Step S1, the processing progresses to Step S2 to progress to a sub-flow of μ-correction-coefficient calculation processing. Referring to the sub-flow of FIG. 11, at Step 10, the rate-of-change ΔNe of the engine speed during shifting is calculated by the ΔNe-during-shifting calculation means 170. At subsequent Step 11, the actual-rotational-difference absorption-torque calculation means 150 drives the actual-rotational-difference absorption torque using the actual rotational difference absorption torque-ΔNe table 160. At Step 12, the average value Tj of the actual-rotational-difference absorption torques during shifting is calculated. At subsequent Step S13, the average value Sh of the engine-torque estimation-values in a sampling period is calculated. Note that, the sampling period is the period arbitrarily set in a period of shifting.

Here, the period of shifting, i.e., the period from the start to the end of shifting, can be set using various parameters. For example, at the time of the shift up during acceleration, it can be set as the period from the time when the engine speed starts to descend after ascending until the time when it changes to rise again. It is also possible to set the period, by detecting a shifting ratio between the main shaft and the counter shaft, from the time when the shifting ratio starts to change until the time when the shifting ratio reaches a shifting ratio after shifting. Furthermore, the start timing of shifting may be set as the time when a drive signal is sent to the valves 42a and 42b so as to drive the clutch.

However, during a period immediately after the start and immediately before the end of shifting, the engine speed may fluctuate largely as compared with a period in the middle of shifting, and the noise of the various sensors may increase. Accordingly, in the present embodiment, the calculation of the rate-of-change ΔNe of the engine speed, the engine torque, and the demanded-rotational-difference absorption torque is set to be performed in the sampling period not containing the period immediately after the start and immediately before the end of shifting. Here, FIG. 12 is referred to.

FIG. 12 is a graph showing the sampling period described above. This graph corresponds to a running state at the time when shifting to the second speed gear is started during acceleration in the first speed gear. Here, if transition of Ne is focused, the shifting is started at time t50 and the shifting is completed at time t60. However, in the example of this graph, the sampling period is set to be a period from time t51 which is a predetermined time after the time t50 until time t52 which is a predetermined time before the time t60. In this sampling period, the calculation of ΔNe, the engine torque, and the demanded-rotational-difference absorption torque is set to be performed. The sampling period is set within the period in which the transmission control unit 100 which sends shifting signals to the shift control motor 25, the first clutch CL1, and the second clutch CL2 determines that the gear ratio of the transmission 21 is changing.

According to this setting, is possible to perform the stably calculation processing of ΔNe, the engine torque, and the demanded-rotational-difference absorption torque while avoiding the calculation immediately after the start and immediate y before the end of shifting. Furthermore, the sampling period can be set depending on the measuring time of the timer 102, and can be provided in the arbitrary positions within the period during shifting. One or more calculation processing among the calculation processing of ΔNe, the average value of the engine torque, and the average value of the demanded-rotational-difference absorption torque may be performed in the sampling period.

Returning to the sub-flow of FIG. 11, at Step S14, the demanded-rotational-difference absorption-torque average value Ty is calculated. Furthermore, at Step 15, the μ correction coefficient is calculated by the arithmetic equation of "K=(Tj+Sh)/(Ty+Sh)". Then, the processing returns to the main flow of FIG. 10.

Note that, the calculation processing of the μ correction coefficient can be set not to be performed when the above-described sampling period is shorter than a predetermined period. This means that the arithmetic processing is not performed when the μ correction coefficient effective in the feedback control of the clutch control amount cannot be calculated, for example, when the throttle is caused to return during shifting and the shifting operation is completed in a shorter time than usual. Thereby, it is possible to reduce the load of the arithmetic processing.

Although the calculation processing of the μ correction coefficient can be performed in all the speed stages, when the rate-of-change of the gear ratio measured during shifting is smaller than a predetermined value, the calculation processing may be set not to be performed at the time of shifting between higher-speed gears, for example, the time of shifting up from the fifth speed to the sixth speed or the like. In this manner also, the load of the arithmetic processing may be reduced.

In addition, the calculation processing of the μ correction coefficient can be set not to be performed when the throttle opening measured during shifting is smaller than a predetermined value, nor when the rate-of-change in the throttle opening measured during shifting is larger than a predetermined value. Accordingly, when the μ correction coefficient effective in the feedback control of the clutch control amount cannot be calculated, the load of arithmetic processing can be reduced by not performing the unnecessary arithmetic processing. Furthermore, when various conditions as described above are satisfied and the μ correction coefficient is not calculated, the control amount of the clutch can be determined on the basis of the μ correction coefficient which has been already calculated.

At Step S3 of FIG. 10, by the correction-friction-coefficient calculation means 120, the correction friction coefficient μh is calculated by applying a μ correction coefficient K to a predetermined arithmetic equation. At sequent Step S4, the control correction amount of the clutch is calculated by the clutch-control-correction-amount calculation means 110, and the series of the processing is completed. Furthermore, the calculated control correction amount is usable not only at the time of shifting but in the clutch connection control at the time of starting the vehicle.

As described above, in the clutch control device according to the present invention, the rate-of-change ΔNe of the engine speed during shifting is inputted to the actual rotational difference absorption torque-ΔNe table so that an actual-rotational-difference absorption torque during shifting is derived. Moreover, the throttle opening and the engine speed are inputted to the engine-torque estimation-value map so that an engine torque during shifting is derived. Furthermore, an actual clutch capacity is calculated from the actual-rotational-difference absorption torque and the engine torque, and a μ correction coefficient is calculated on the basis of the ratio of the actual clutch capacity and the demanded clutch capacity; thereby, the actual clutch capacity and the μ correction coefficient can be calculated on the basis of the rate-of-change of the engine speed during shifting and the engine-torque average value. Accordingly, even when the clutch capacity changes due to deterioration of a clutch plate over time or a change of the characteristics of an oil for operating a clutch, it becomes possible to perform suitable clutch control using the friction coefficient to which the μ correction coefficient is applied.

Note that, structures of the clutch and the valve of the twin clutch type transmission device, structures of the actual rotational difference absorption torque-ΔNe table and the engine-torque estimation-value map, the set value of the sampling period, or he like, are not limited to the above-described embodiment. Various modifications are possible. A clutch control device according o the present invention may be adopted, without limitation to a motorcycle, in a tricycle, a four-wheeled vehicle, and the like.

REFERENCE SIGNS LIST

Figure 1:
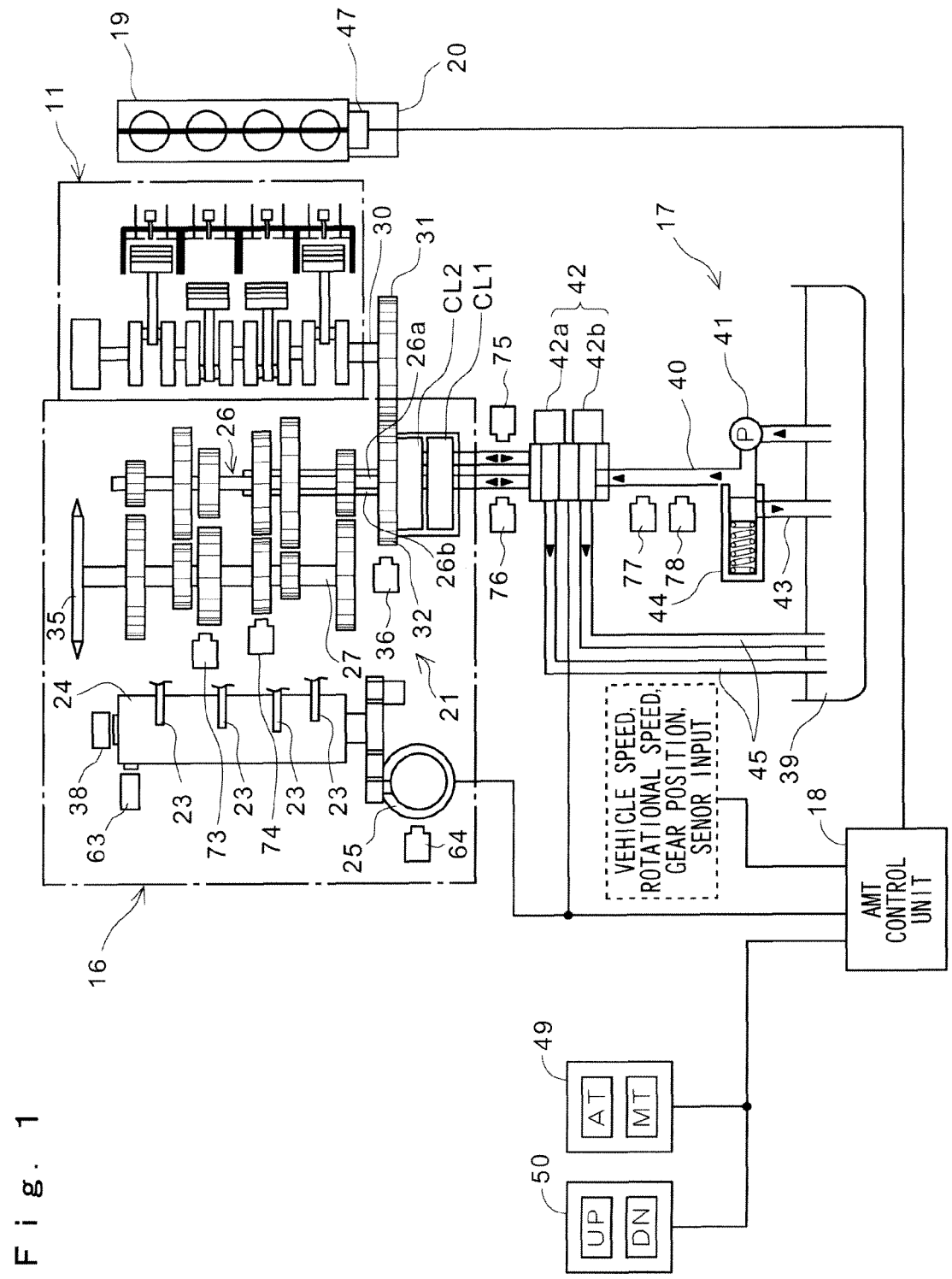
FIG. 1 is a system block diagram of an AMT according to one embodiment of the present invention and its peripheral devices.
Figure 2:
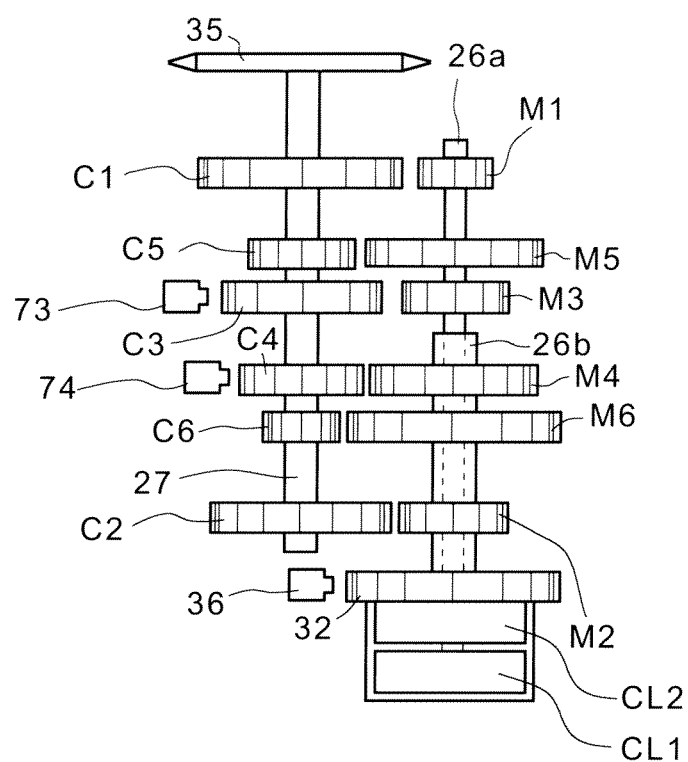
FIG. 2 is an arrangement relationship diagram showing an engagement relation of each shaft and speed gear in the AMT.
Figure 3:
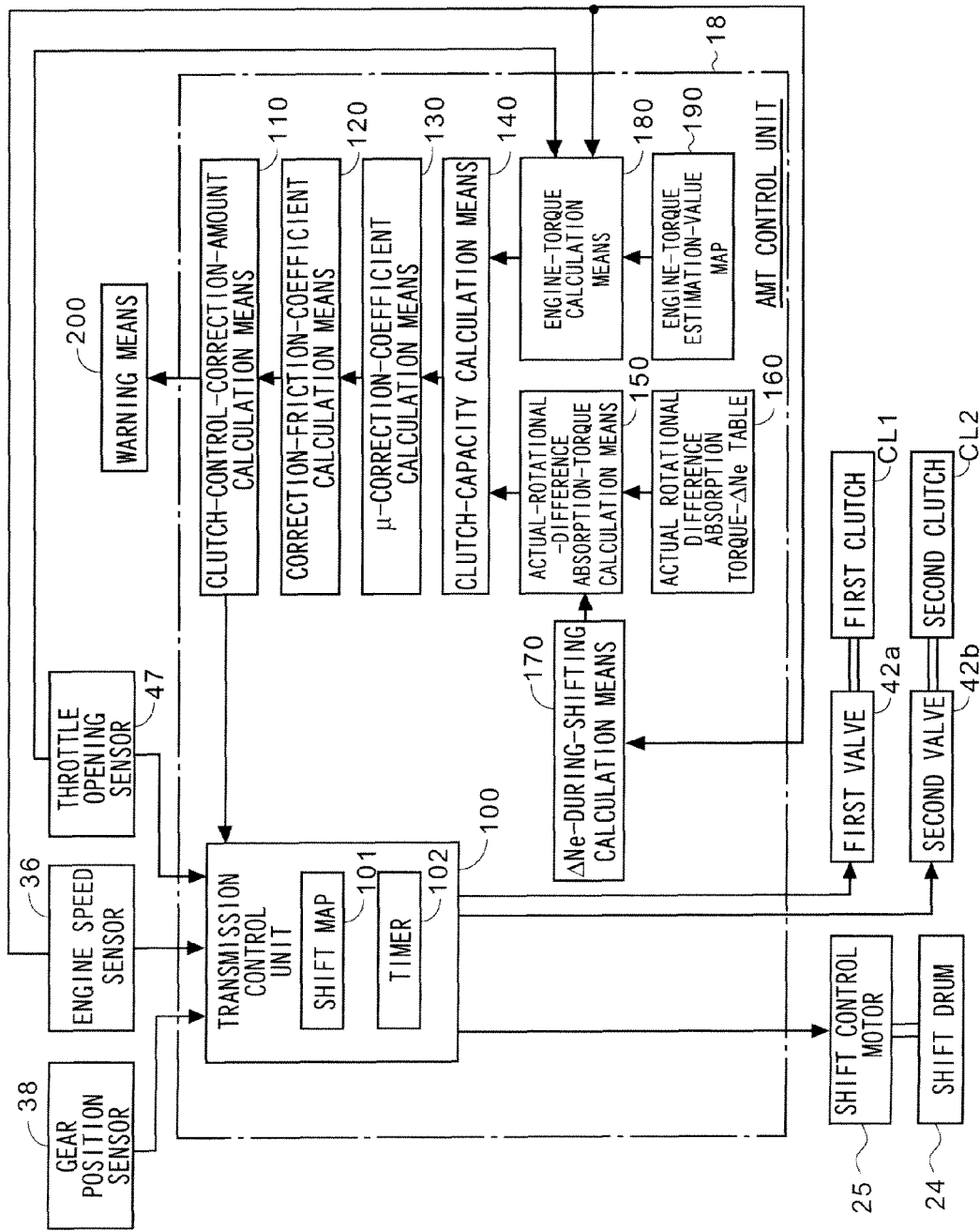
FIG. 3 is a block diagram showing a structure of an AMT control unit and its peripheral devices.
Figure 4:
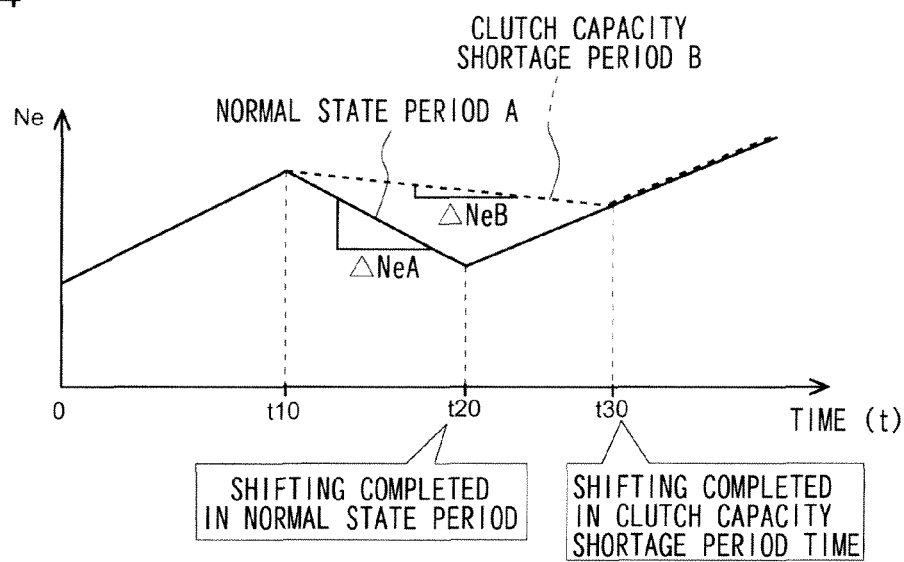
FIG. 4 is a graph showing transition of an engine speed at the time of a shifting operation.
Figure 5:
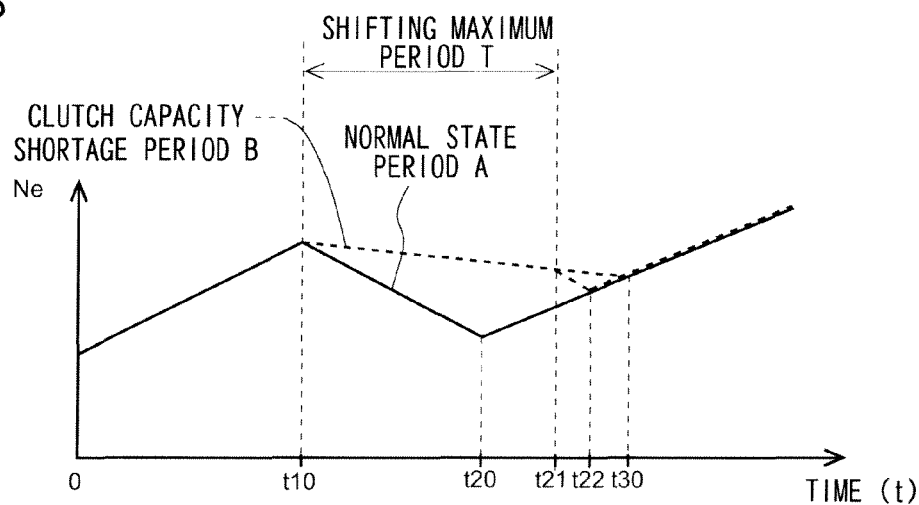
FIG. 5 is a graph showing a correction after a shifting maximum e elapses.
Figure 6:
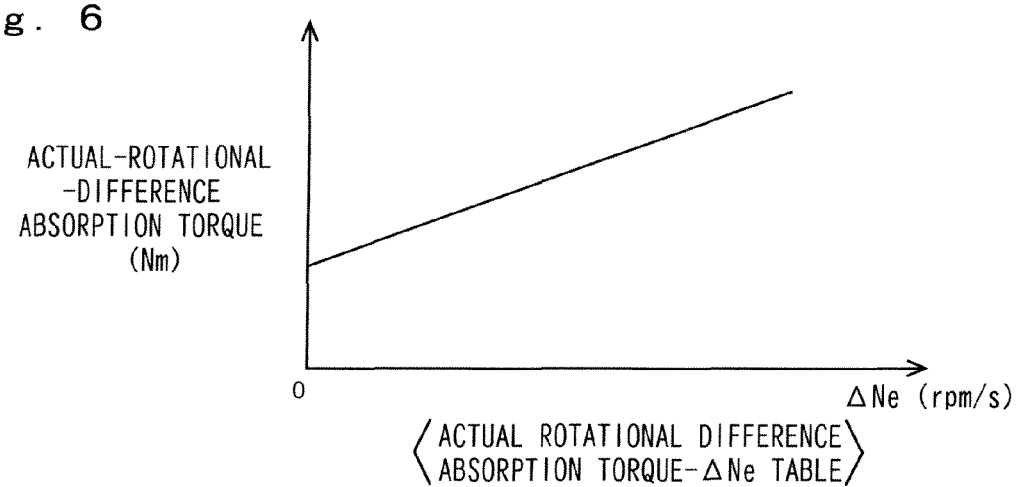
FIG. 6 is an actual rotational difference absorption torque-ΔNe table according to the embodiment of the present invention.
Figure 7:
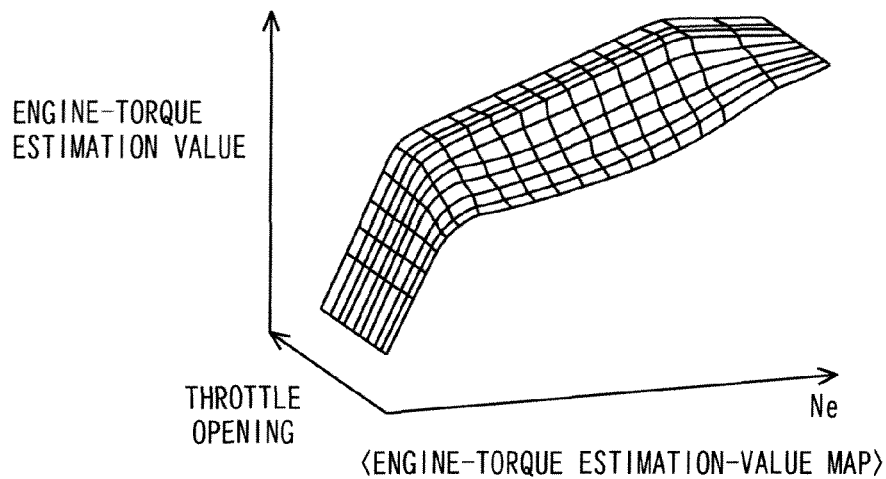
FIG. 7 is an engine-torque estimation-value map according to the embodiment of he present to the embodiment of he present
Figure 8:
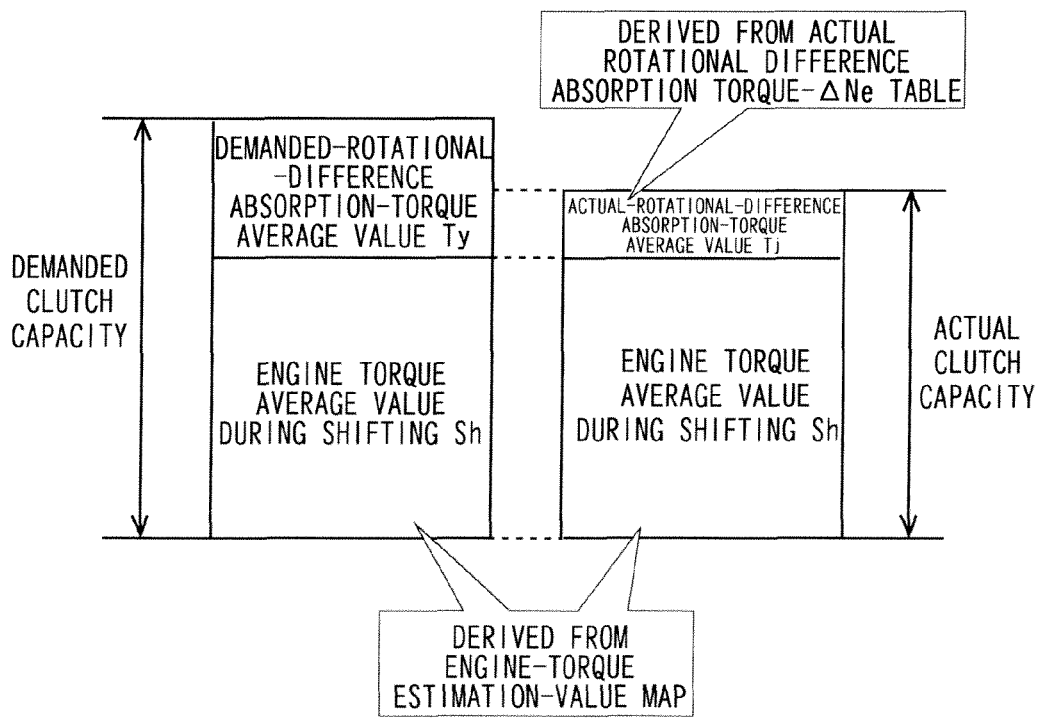
FIG. 8 is a graph showing a relation between an actual clutch capacity and a demanded clutch capacity.
Figure 9:
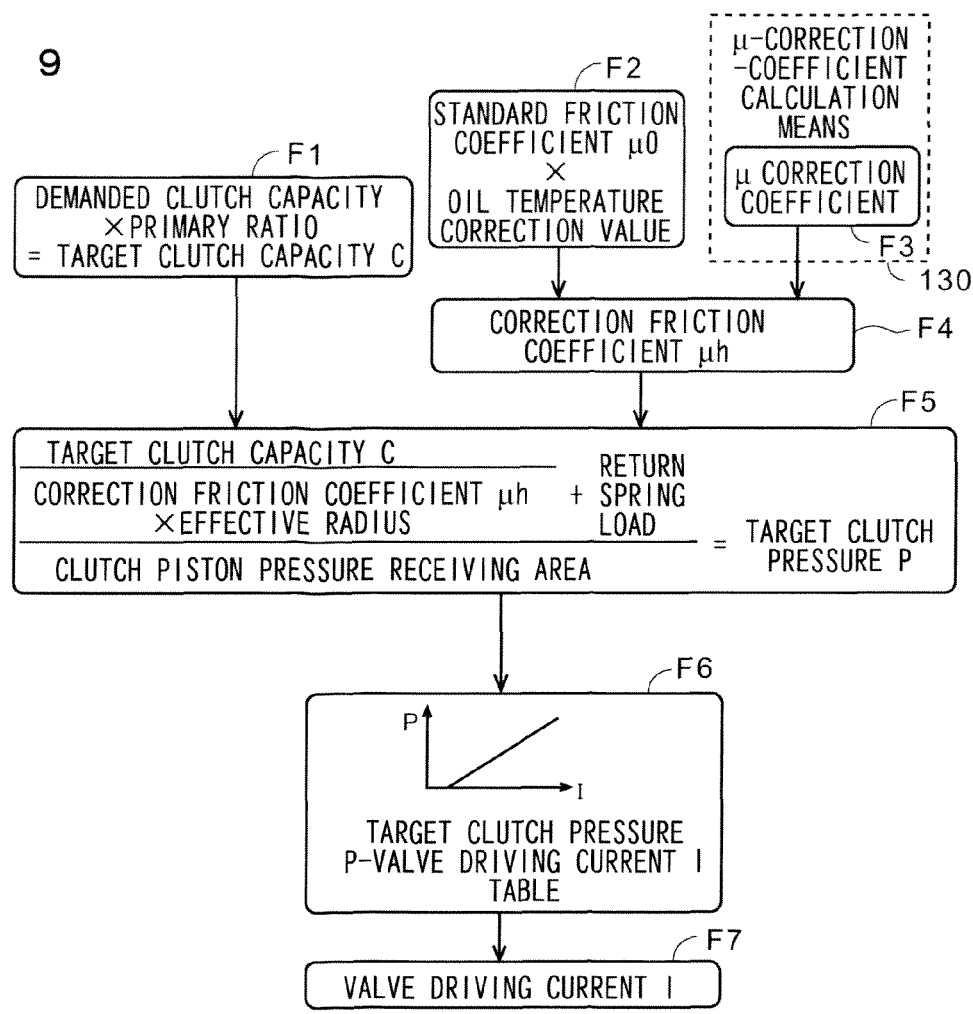
FIG. 9 is a block diagram showing a calculation procedure of a control correction amount of a clutch.
Figure 10:
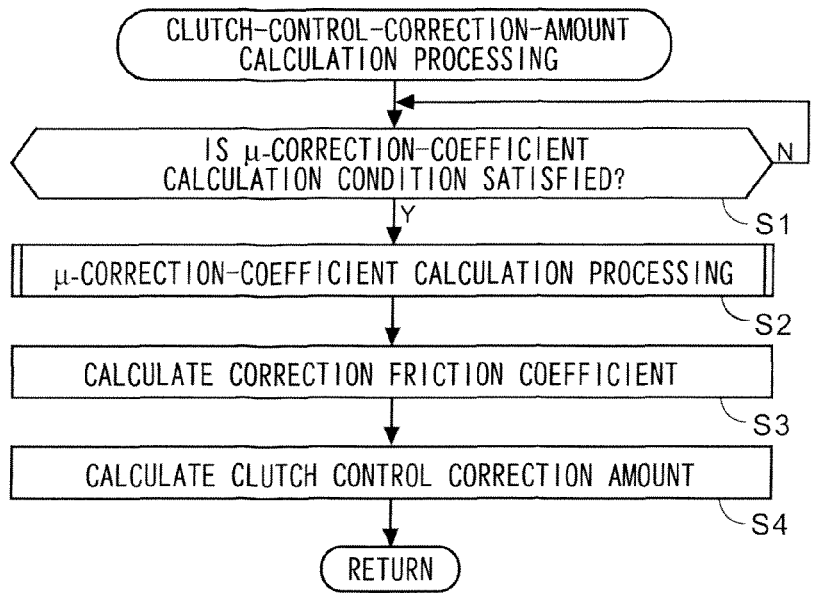
FIG. 10 is a flow chart (main flow) showing a flow of clutch-control-correction-amount calculation processing.
Figure 11:
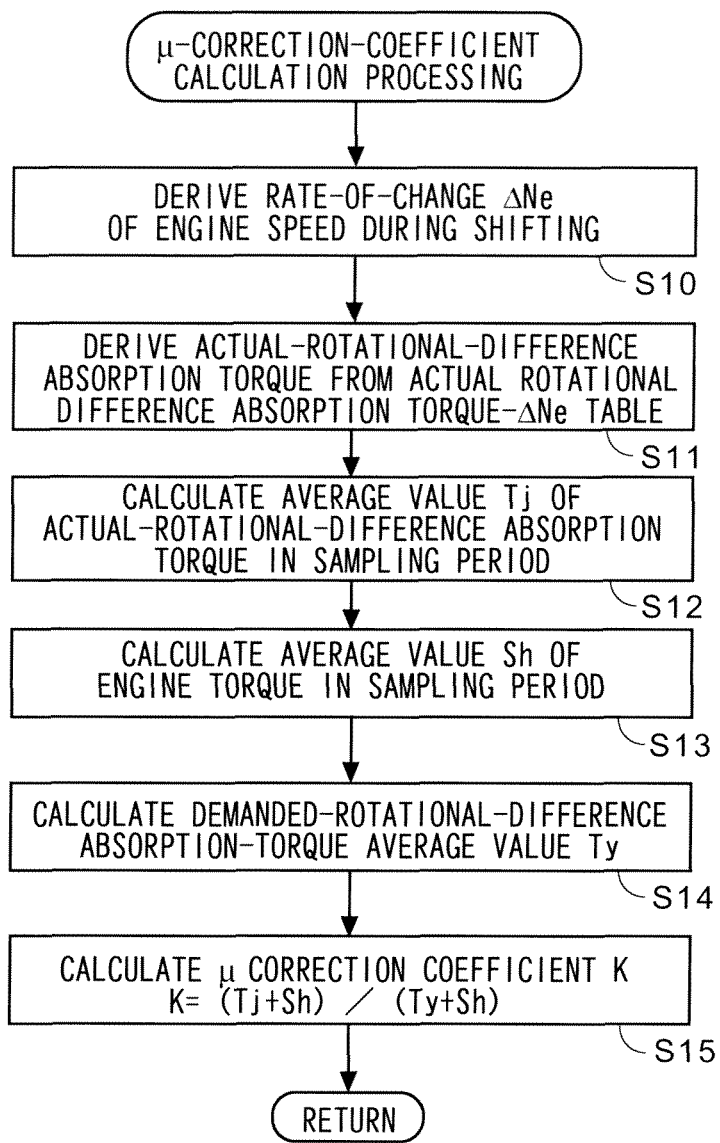
FIG. 11 is a flow chart (sub-flow) showing a flow of μ correction coefficient calculation processing.
Figure 12:
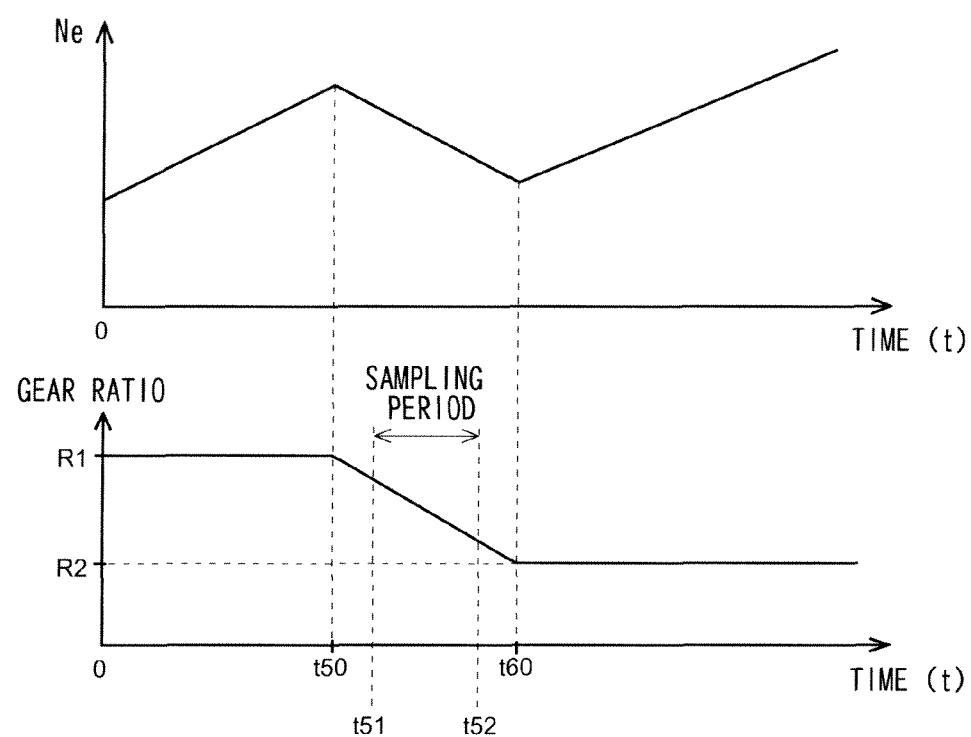
FIG. 12 is a graph showing a sampling period for calculating ΔNe and an engine torque.

11 ENGINE
16 AMT
25 SHIFT CONTROL MOTOR
42 VALVE
26a INNER MAIN SHAFT
26b OUTER MAIN SHAFT
27 COUNTER SHAFT
36 ENGINE SPEED SENSOR
42a FIRST VALVE
42b SECOND VALVE
47 THROTTLE OPENING SENSOR
100 TRANSMISSION CONTROL UNIT (CLUTCH CONTROL MEANS)
101 SHIFT MAP
102 TIMER
110 CLUTCH-CONTROL-CORRECTION-AMOUNT CALCULATION MEANS
120 CORRECTION-FRICTION-COEFFICIENT CALCULATION MEANS
130 μ-CORRECTION-COEFFICIENT CALCULATION MEANS
140 CLUTCH-CAPACITY CALCULATION MEANS
150 ACTUAL-ROTATIONAL-DIFFERENCE ABSORPTION-TORQUE CALCULATION MEANS
160 ACTUAL ROTATIONAL DIFFERENCE ABSORPTION TORQUE-ΔNe TABLE (DATA TABLE)
170 ΔNe-during-shifting calculation means
180 ENGINE-TORQUE CALCULATION MEANS
190 ENGINE-TORQUE ESTIMATION-VALUE MAP (DATA MAP)
M1-6 FIRST TO SIXTH SPEED DRIVING GEAR
C1-6 FIRST TO SIXTH SPEED DRIVEN GEAR
CL1 FIRST CLUTCH
CL2 SECOND CLUTCH
Tv DEMANDED-ROTATIONAL-DIFFERENCE ABSORPTION-TORQUE AVERAGE VALUE DURING SHIFTING
Tj ACTUAL-ROTATIONAL-DIFFERENCE ABSORPTION-TORQUE AVERAGE VALUE DURING SHIFTING
Sh ENGINE TORQUE AVERAGE VALUE DURING SHIFTING

The invention claimed is:

1. A clutch control device for a clutch which connects and disconnects a rotational driving force transmitted to a staged transmission from an engine of a vehicle, the clutch control device comprising:
   clutch control means for controlling a control amount of the clutch;
   engine-speed detection means for detecting a speed of the engine;
   shifting-condition detection means for detecting a shifting condition of the transmission;
   rate-of-change-of-engine-speed-during-shifting calculation means for detecting a rate-of-change of the engine speed during shifting of the transmission;
   actual-rotational-difference absorption-torque calculation means for calculating an actual-rotational-difference absorption torque used for a rotational change during the shifting by applying the rate-of-change of the engine speed into the calculation;
   engine-torque calculation means for calculating an engine torque which the engine generates, by applying at least a throttle opening and the engine speed into the calculation; and
   frictional-correction-coefficient calculation means for calculating a correction coefficient of a friction coefficient of the clutch,
   wherein the frictional-correction-coefficient calculation means calculates an actual clutch capacity from a sum of an average value of actual-rotational-difference absorption-torques during shifting and an average value of engine torques calculated during the shifting, and further calculates a frictional correction coefficient on the basis of a ratio of the actual clutch capacity and a demanded clutch capacity calculated from a condition of the vehicle; and
   the clutch control means controls the clutch on the basis of the frictional correction coefficient.

2. The clutch control device according to claim 1, wherein the demanded clutch capacity is a sum of an average value of demanded-rotational-difference absorption torques during shifting calculated from a predetermined value and the average value of the engine torques during the shifting.

3. The clutch control device according to claim 1, wherein at least one of the calculation of the rate-of-change of the engine speed and the calculation of the average value of the engine torques is performed in a sampling period, within a period during shifting, when it is determined by the shifting-condition detection means that a gear ratio of the transmission is changing in response to a shifting signal sent to the transmission.

4. The clutch control device according to claim 2, wherein at least one of the calculation of the rate-of-change of the engine speed and the calculation of the average value of the engine torques is performed in a sampling period when it is determined by the shifting-condition detection means that a gear ratio of the transmission is changing in response to a shifting signal sent to the transmission.

5. The clutch control device according to claim 3, wherein the calculation of the frictional correction coefficient is performed when the sampling period is equal to or longer than a predetermined period.

6. The clutch control device according to claim 4, wherein the calculation of the frictional correction coefficient is performed when the sampling period is equal to or longer than a predetermined period.

7. The clutch control device according to claim 1, wherein the calculation of the frictional correction coefficient is performed when a rate-of-change of the gear ratio measured during the shifting is equal to or larger than a predetermined value.

8. The clutch control device according to claim 2, wherein the calculation of the frictional correction coefficient is performed when a rate-of-change of the gear ratio measured during the shifting is equal to or larger than a predetermined value.

9. The clutch control device according to claim 1, wherein the calculation of the frictional correction coefficient is performed when the throttle opening measured during the shifting is equal to or larger than a predetermined value.

10. The clutch control device according to claim 2, wherein the calculation of the frictional correction coefficient is performed when the throttle opening measured during the shifting is equal to or larger than a predetermined value.

11. The clutch control device according to claim 1, wherein the calculation of the frictional correction coefficient is performed when a rate-of-change of the throttle opening measured during the shifting is equal to or smaller than a predetermined value.

12. The clutch control device according to claim 2, wherein the calculation of the frictional correction coefficient is performed when a rate-of-change of the throttle opening measured during the shifting is equal to or smaller than a predetermined value.

13. The clutch control device according to claim 1, wherein
   the clutch is of a twin clutch type including a first clutch and a second clutch, and is structured so that connecting states of the first clutch and the second clutch may be switched alternatively for every shifting operation, thereby transmitting the rotational driving force of a power source to a drive wheel, and
   the calculation of the frictional correction coefficient is performed at the time of the shifting operation.

14. The clutch control device according to claim 2, wherein
   the clutch is of a twin clutch type including a first clutch and a second clutch, and is structured so that connecting states of the first clutch and the second clutch may be switched alternatively for every shifting operation, thereby transmitting the rotational driving force of a power source to a drive wheel, and
   the calculation of the frictional correction coefficient is performed at the time of the shifting operation.

15. A frictional correction coefficient calculating method for calculating a frictional correction coefficient to control a clutch which connects and disconnects a rotational driving force transmitted to a staged transmission from an engine of a vehicle, the method comprising the procedures of:
   detecting a rate-of-change of an engine speed during shifting of the transmission;
   calculating an actual-rotational-difference absorption torque used for a rotational change during the shifting by inputting the rate-of-change of the engine speed to a predetermined data table;
   calculating an engine torque which the engine generates by inputting at least a throttle opening and the engine speed to a predetermined data map; and
   calculating an actual clutch capacity from a sum of average values of the actual-rotational-difference absorption torque and the engine torque during the shifting, respectively, and further calculating the frictional correction coefficient on the basis of a ratio of the actual clutch capacity and a demanded clutch capacity calculated from a condition of the vehicle.

* * * * *